US012587940B2

(12) United States Patent　　　　(10) Patent No.:　US 12,587,940 B2
　　Chen et al.　　　　　　　　　　　(45) Date of Patent:　　Mar. 24, 2026

(54) METHOD AND APPARATUS FOR PACKET REROUTING

(71) Applicant: ZTE Corporation, Shenzhen (CN)

(72) Inventors: Lin Chen, Shenzhen (CN); Ying Huang, Shenzhen (CN); Liping Wang, Shenzhen (CN); Hao Zhu, Shenzhen (CN); Xueying Diao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 514 days.

(21) Appl. No.: 18/305,170

(22) Filed: Apr. 21, 2023

(65) Prior Publication Data

US 2023/0388894 A1　　Nov. 30, 2023

Related U.S. Application Data

(63) Continuation of application No. PCT/CN2020/122835, filed on Oct. 22, 2020.

(51) Int. Cl.
　　*H04W 40/02*　　　(2009.01)
(52) U.S. Cl.
　　CPC .................................. *H04W 40/02* (2013.01)
(58) Field of Classification Search
　　None
　　See application file for complete search history.

(56) References Cited

U.S. PATENT DOCUMENTS

| | | | | |
|---|---|---|---|---|
| 10,680,899 B1 * | 6/2020 | Ibarra | ..................... | H04L 41/12 |
| 2020/0045610 A1 * | 2/2020 | Shih | ......................... | H04L 45/28 |
| 2020/0053629 A1 * | 2/2020 | Majmundar | .......... | H04W 40/36 |
| 2020/0245223 A1 * | 7/2020 | Cheng | .................... | H04W 40/12 |
| 2021/0119920 A1 * | 4/2021 | Tesanovic | ......... | H04W 28/0278 |
| 2021/0250817 A1 | 8/2021 | Zou et al. | | |
| 2021/0258244 A1 * | 8/2021 | Xu | .......................... | H04L 45/28 |
| 2022/0141749 A1 | 5/2022 | Luo et al. | | |
| 2023/0164620 A1 * | 5/2023 | Lee | ....................... | H04W 40/34 |
| 2023/0247523 A1 * | 8/2023 | Yi | ......................... | H04W 76/19 |

FOREIGN PATENT DOCUMENTS

| | | |
|---|---|---|
| CN | 110536350 | 12/2019 |
| CN | 110636570 | 12/2019 |
| CN | 111490942 | 8/2020 |

OTHER PUBLICATIONS

Hindi-language Office Action issued in Indian Application No. 202317028750 dated Dec. 23, 2024 with English translation (6 pages).
International Search Report and Written Opinion issued in PCT Application No. PCT/CN2020/122835 mailed on Jul. 12, 2021 (7 pages).

* cited by examiner

*Primary Examiner* — Brian S Roberts
(74) *Attorney, Agent, or Firm* — Crowell & Moring LLP

(57)　　　　　ABSTRACT

This disclosure relates to methods and apparatus for packet rerouting. In one embodiment, a method of packet rerouting includes receiving, by a wireless node from a donor central unit (CU), packet rerouting configuration information, and rerouting, by the wireless node, a transmission of a packet from a first transmission path to a second transmission path in response to, at least in part, the packet rerouting configuration information.

19 Claims, 9 Drawing Sheets

IAB node 4

| destination address | Path id | next hop |
|---|---|---|
| BAP address of donor DU | 1 | BAP address of IAB node 5 |
| BAP address of donor DU | 2 | BAP address of IAB node 6 |
| BAP address of donor DU | 3 | BAP address of IAB node 5 |
| BAP address of donor DU | 4 | BAP address of IAB node 6 |
| BAP address of IAB node 3 | 2 | BAP address of IAB node 3 |
| BAP address of IAB node 3 | 3 | BAP address of IAB node 3 |
| BAP address of IAB node 2 | 1 | BAP address of IAB node 2 |
| BAP address of IAB node 2 | 3 | BAP address of IAB node 2 |
| BAP address of IAB node 1 | 2 | BAP address of IAB node 3 |
| BAP address of IAB node 1 | 1 | BAP address of IAB node 2 |
| BAP address of IAB node 1 | 3 | BAP address of IAB node 3 |
| BAP address of IAB node 1 | 3 | BAP address of IAB node 2 |
| . . . | | . . . |

FIG. 4

| Destination IP address | IPv6 flow label | DSCP | Destination address | Path id |
|---|---|---|---|---|
| IP address of IAB node 1 | 1000 | 1 | BAP address of IAB node 1 | 1 |
| IP address of IAB node 1 | 1001 | 2 | BAP address of IAB node 1 | 2 |
| IP address of IAB node 1 | 1002 | 3 | BAP address of IAB node 1 | 3 |
| IP address of IAB node 1 | 1003 | 4 | BAP address of IAB node 1 | 4 |
| IP address of IAB node 1 | 1004 | 5 | BAP address of IAB node 1 | 1 |

For destination BAP address of IAB node 1:

path id 1: donor DU->IAB node 5->IAB node 4->IAB node 1 path id 2: donor DU->IAB node 5->IAB node 4->IAB node 1 path id 3: donor DU->IAB node 6->IAB node 4->IAB node 2->IAB node 1 path id 4: donor DU->IAB node 6->IAB node 4->IAB node 3->IAB node 1

FIG. 5

| UL traffic Type | Destination address | Path id |
|---|---|---|
| F1-U GTP-U tunnel 1 | BAP address of donor DU | 1 |
| F1-U GTP-U tunnel 2 | BAP address of donor DU | 2 |
| UE-associated F1AP signalling | BAP address of donor DU | 3 |
| non-UE associated F1AP signalling | BAP address of donor DU | 4 |
| non-F1 | BAP address of donor DU | 1 |

For destination BAP address of donor DU:

path id 1: IAB node 1->IAB node 2->IAB node 4->IAB node 5->donor DU path id 2: IAB node 1->IAB node 2->IAB node 4->IAB node 6->donor DU path id 3: IAB node 1->IAB node 3->IAB node 4->IAB node 5->donor DU path id 4: IAB node 1->IAB node 3->IAB node 4->IAB node 6->donor DU

FIG. 6

METHOD AND APPARATUS FOR PACKET REROUTING

CROSS-REFERENCE TO RELATED APPLICATION

This application is a continuation application of PCT International Patent Application No. PCT/CN2020/122835, filed with the China National Intellectual Property Administration, PRC on Oct. 22, 2020, which is herein incorporated by reference in its entirety.

TECHNICAL FIELD

This disclosure is directed generally to methods for rerouting packets, particularly within an Integrated Access and Backhaul (IAB) network.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. The performance requirements placed on the network will demand connectivity in terms of data rate, latency, quality of service (QoS), security, availability, and many other parameters, all of which will vary from one service to the next. Thus, enabling a network to allocate resources in a flexible manner to provide customized connectivity for each different type of service will greatly enhance the network's ability to meet future demands.

To meet these demands, the development of 5th Generation (5G) mobile wireless technologies and standards are well underway. One such technology is a split network architecture wherein the Radio Access Network (RAN) functionality is split between a Central Unit (CU) and multiple Distributed Units (DUs). For example, RAN functions may be split at the point between the Packet Data Convergence Protocol (PDCP) layer and the Radio Link Control (RLC) layer of the 5G protocol stack, wherein DUs will handle all processes up to and including the RLC layer functions and the CU will handle PDCP layer and higher layer functions prior to the core network. This disaggregation of RAN functions will provide numerous advantageous to mobile network operators. For example, through the isolation of the stack from the PDCP layer and upwards, the CU will be able to act as a Cloud-based convergence point among multiple heterogeneous technologies in the provisioned networks and hence will be able to serve multiple heterogeneous DUs.

Another technology being developed for 5G networks is an Integrated Access and Backhaul (IAB) architecture for providing high-speed wireless backhaul to cell sites (e.g., base stations). As data demands and the number of cell sites increase, it is becoming more difficult to provide traditional fiber optic backhaul access to each cell site, which is especially true for small cell base stations. Under the IAB architecture, the same infrastructure and resources (e.g., IAB nodes) can be used to provide both access and backhaul to support User Equipment (UE) Packet Data Unit (PDU) sessions, for example. The IAB architecture for New Radio (NR) networks will provide wireless backhaul and relay links enabling flexible and dense deployment of NR cells without the need for densifying the transport network proportionately. Additionally, IAB technologies will allow for easier deployment of a dense network of self-backhauled NR cells in a more integrated and robust manner. For example, the IAB technology in the 5G NR network will support a multi-hop relay system, where the network topology also supports redundant connections.

FIG. 1 illustrates a block diagram of an example IAB architecture network 100 wherein a core network 102 is connected to a donor IAB node 104 (also referred to as a "wireless node" herein), for example, via a wired or cabled connection (e.g., a fiber optic cable) between two nodes or devices. The terminating node of NR backhauling on network side is referred to as the IAB donor 104, which represents a gNB with additional functionality to support IAB. The IAB donor 104 is wirelessly coupled to a plurality of intermediate IAB nodes 106a and 106b and two serving IAB nodes 106c and 106d, which coupling may be direct or indirect and wired or wireless communications between two nodes or devices.

As shown in the example architecture of FIG. 1, serving IAB nodes 106c and 106d are directly coupled to UEs 108a and 108b, respectively, and function as the serving cell site base stations or access points for the UEs 108a and 108b. The serving IAB nodes 106c and 106d also function as relay and can forward their respective UE signals to their respective next uplink nodes in the transmission path, and forward downlink signals to their respective UEs 108a and 108b. As shown in FIG. 1, the serving IAB node 106c can forward uplink UE signals to one or both of the intermediate IAB nodes 106a and 106b, and receive downlink UE signals from one or both of the intermediate IAB nodes 106a and 106b. The intermediate IAB nodes 106a and 106b can forward uplink UE signals to the donor IAB node 104, and forward downlink signals to the serving IAB node 106d. The serving IAB node 106c can forward uplink UE signals to the donor IAB node 104, which can then forward all received signals to the core network 102, and can forward downlink signals from the donor IAB node 104 to the access UE 108a.

Each of the IAB nodes 106a-106d can have two functions: a base station (BS) function and a mobile terminal (MT) function. The BS function means the IAB node can work like a base station to provide the radio access function for a UE. The BS part of an IAB node refers to that portion of the IAB node, including all hardware, firmware and/or software related to performing the BS functions of the IAB node. The MT function means the IAB node can work like a mobile terminal to be controlled and scheduled by the IAB donor node or an upper IAB node. The MT part of an IAB node refers to that portion of the IAB node, including all hardware, firmware and/or software related to performing the MT functions of the IAB node.

Referring still to FIG. 1, if the network 100 also implements a split architecture, the donor IAB node 104 would be replaced by a donor CU connected to the core network 102 and a donor DU connected to the donor CU (see FIG. 3). Each of the IAB nodes 106a-106d would be coupled to the donor DU in similar fashion to their coupling to the donor IAB node 104, as shown in FIG. 1.

In a split architecture network, each of the IAB nodes 106a-106d can have two functions: a distributed unit (DU) function and a mobile terminal (MT) function. The DU function means the IAB node can work like a DU to provide the predetermined DU functions for a UE. The DU part of an IAB node refers to that portion of the IAB node, including all hardware, firmware and/or software related to performing the DU functions of the IAB node. The MT function and MT part of an IAB node in a split architecture network is the same as described above for a non-split architecture network.

All IAB-nodes that are connected to an IAB donor via one or multiple hops form a directed acyclic graph (DAG) topology with the IAB donor 104 at its root. In this DAG topology, the neighbor node on the IAB-DU's interface is referred to as child node and the neighbor node on the IAB-MT's interface is referred to as parent node. The direction toward the child node is further referred to as downstream while the direction toward the parent node is referred to as upstream. The IAB-donor performs centralized resource, topology, and route management for the IAB topology.

FIG. 2 shows the IAB user plane protocol stack between IAB-DU and IAB-donor-CU. The interface between a CU and DU (F1, where F1-U is the interface for user data, and F1-C is the interface for control data) uses an IP transport layer between IAB-DU and IAB-donor-CU. The IP layer may be further security-protected. On the wireless backhaul, the IP layer is carried over the Backhaul Adaptation Protocol (BAP) sublayer, which enables routing and bearer mapping over multiple hops. On each backhaul link, the BAP PDUs are carried by backhaul (BH) RLC channels. Multiple BH RLC channels can be configured on each BH link to allow traffic prioritization and QoS enforcement.

The implementation of the split architecture and the IAB architecture technologies in the 5G network raises many challenges. One such challenge involves routing and rerouting backhaul traffic within the multi-hop IAB network topology.

SUMMARY

Methods for packet rerouting within various scenarios are disclosed. In one example, when the IAB node detects congestion over one egress link or routing path, it may reroute the data packet to another less congested egress link or routing path. However, if all the traffic delivered over the congested path is subsequently rerouted to the less congested backup path, the backup path may then become congested. In order to avoid this "ping-pong" issue, it is necessary to consider when and which traffic should be rerouted to keep network loads balanced. In addition, during the rerouting, it is possible that the backup path may also experience radio link failure (RLF) or congestion. As such, it is possible that the data packet could be rerouted multiple times, which may cause a routing loop, thereby causing a failure to satisfy a packet delay budget (PDB) requirement for the packet. Several solutions to these identified problems are disclosed.

In one embodiment, a method of packet rerouting includes receiving, by a wireless node from a donor central unit (CU), packet rerouting configuration information, and rerouting, by the wireless node, a transmission of a packet from a first transmission path to a second transmission path in response to, at least in part, the packet rerouting configuration information.

The above embodiments and other aspects and alternatives of their implementations are described in greater detail in the drawings, the descriptions, and the claims below.

4

Figure 1:
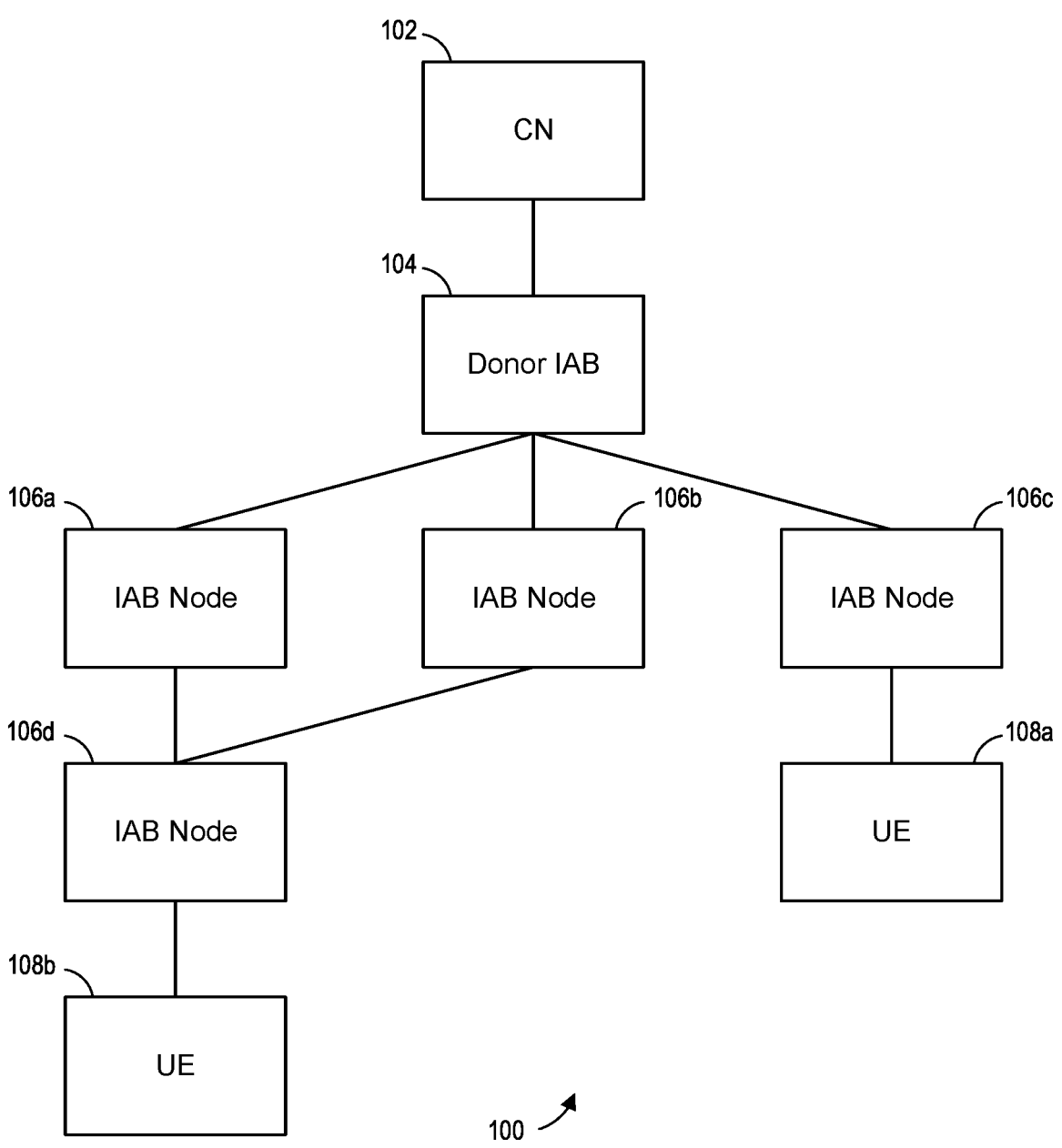
FIG. 1 illustrates a block diagram of an example IAB architecture network in accordance with various embodiments.
Figure 2:
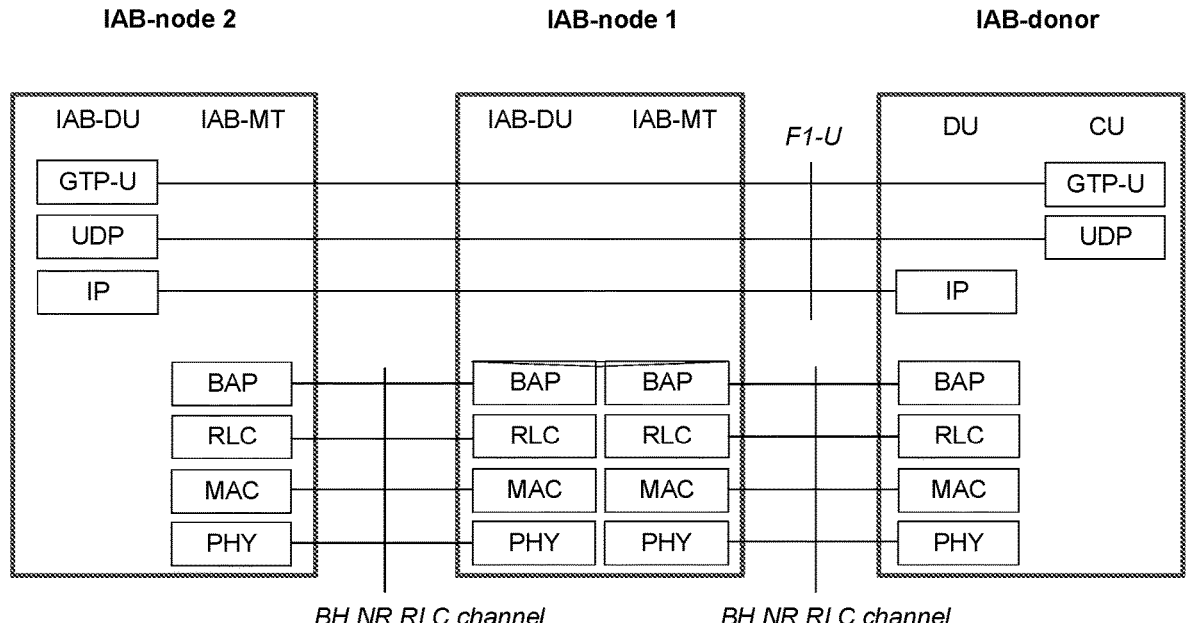

FIG. 2 illustrates an example user plane protocol stack in accordance with various embodiments.

Figure 3:
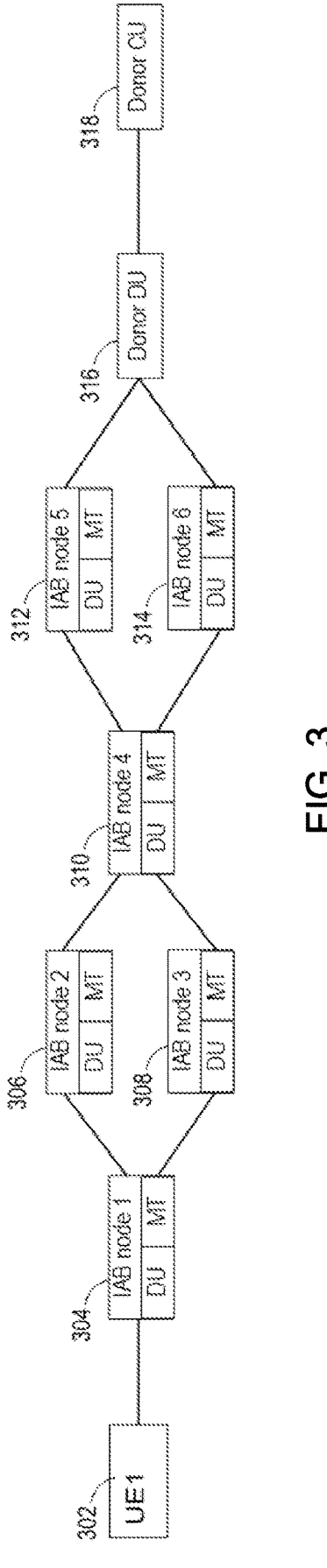

FIG. 3 illustrates an example multi-hop IAB network topology in accordance with various embodiments.

FIG. 4 illustrates an example routing table in accordance with various embodiments.

FIG. 5 illustrates an example routing selection table in accordance with various embodiments.

FIG. 6 illustrates another example routing selection table in accordance with various embodiments.

Figure 7:
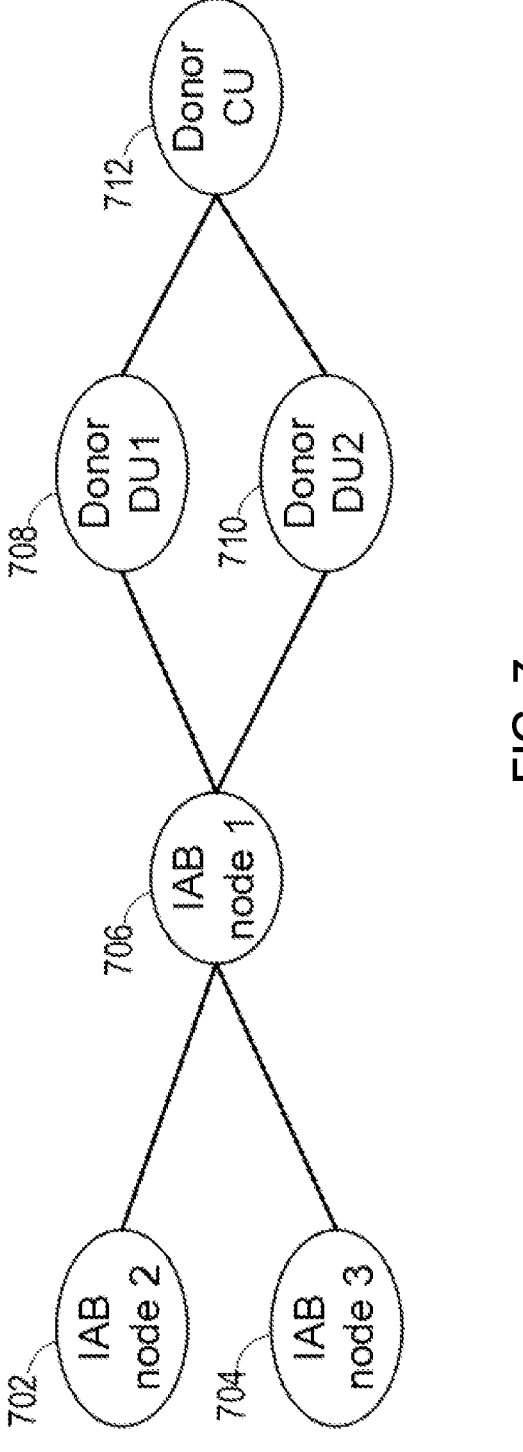

FIG. 7 illustrates an example network arrangement in accordance with various embodiments.

Figure 8:
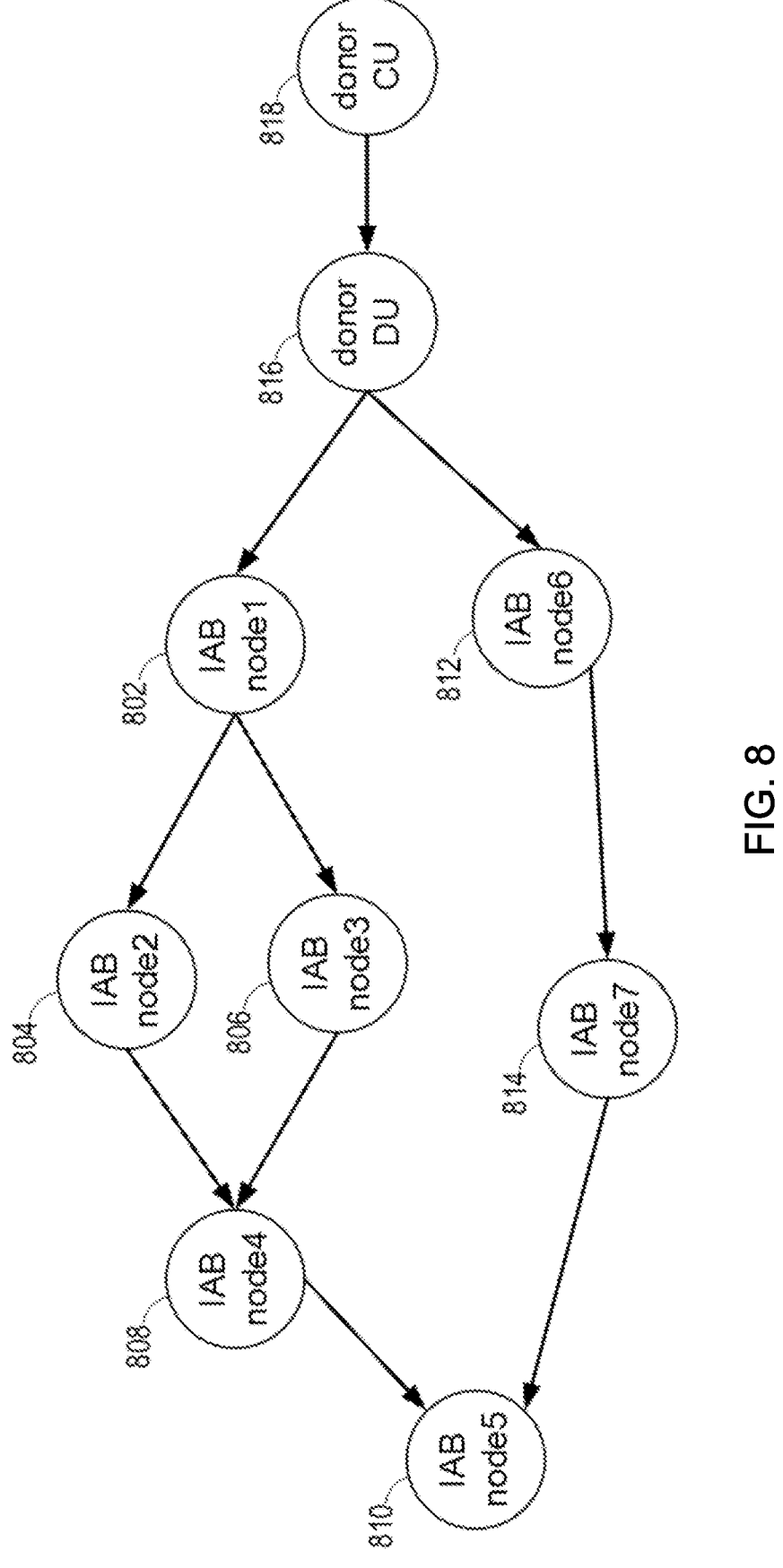

FIG. 8 illustrates another example network arrangement in accordance with various embodiments.

Figure 9:
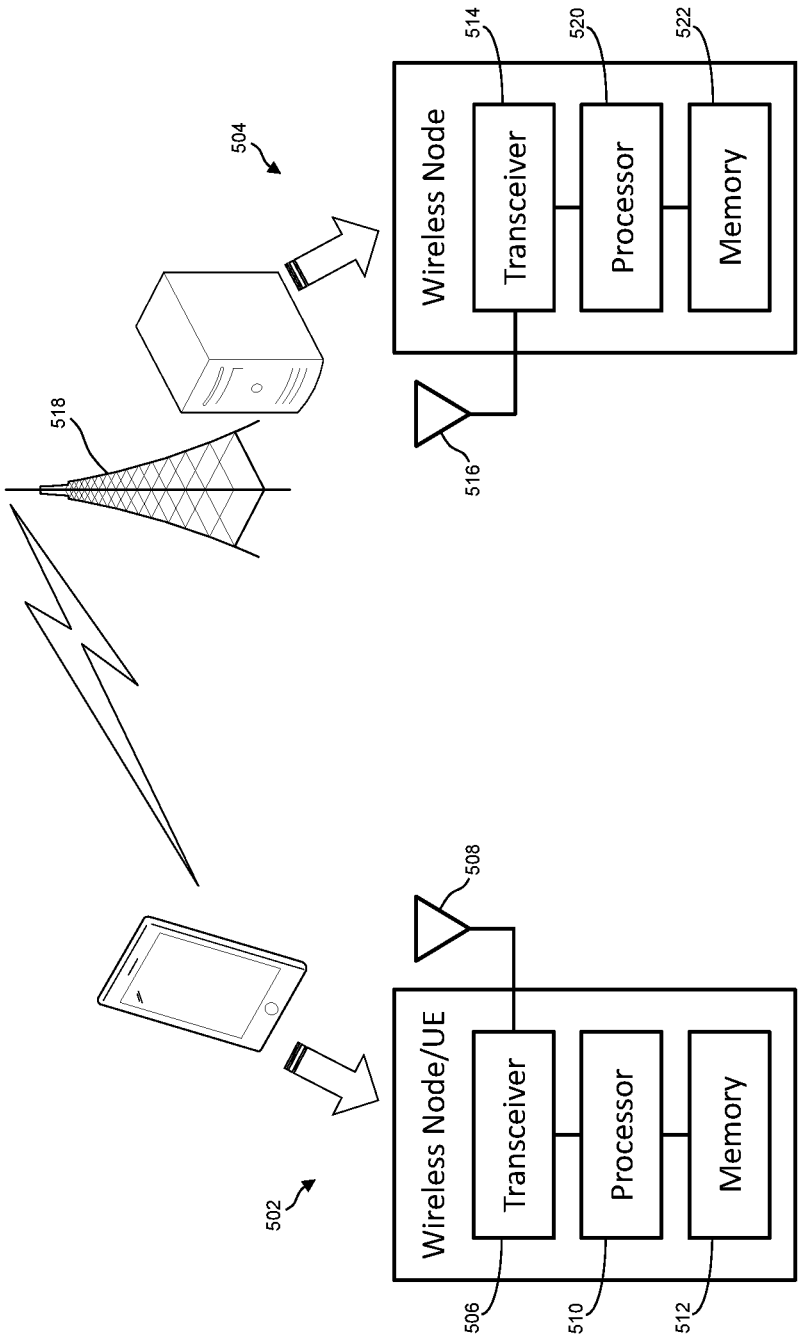

FIG. 9 shows an example system diagram including a wireless node/UE and another wireless node in accordance with various embodiments.

DETAILED DESCRIPTION

The present inventors have developed methods and apparatus capable of performing packet rerouting in various situations, including an ability to avoid repeated rerouting of packets and routing loops.

FIG. 3 shows an example multi-hop IAB network topology in accordance with various embodiments. In order to support the backhaul traffic forwarding, the routing table for each IAB node (e.g., "wireless node") and donor DU 316 should be configured. For example, an IAB-node (e.g., IAB node 1 (304)) determines the next hop node (e.g., IAB node 2 (306)) based on a routing table and a destination IAB node and/or a path ID associated with the data packet to be transmitted. Then the IAB node (e.g., IAB node 1 (304)) can deliver the data packet to next hop node (e.g., IAB node 2 (306)). When the data packet arrives at the next hop IAB node (e.g., IAB node 2 (306)), that IAB node (e.g., IAB node 2 (306)) further determines its next hop node (e.g., IAB node 4 (310)) according to its routing table and can deliver the data packet to that next hop node (e.g., IAB node 4 (310)). This process repeats until the data packet arrives at the destination IAB node.

Because the IAB network supports Multi-Radio Dual Connectivity (MR-DC), an IAB node may dual-connected with two parent IAB nodes, and multiple routing paths may exist between the IAB node and the donor DU. As shown in FIG. 3, there are multiple routing path between IAB node 1 (304) and donor DU 316. For example, a first path may include IAB node 1 (304), IAB node 2 (306), IAB node 4 (310), IAB node 5 (312), and donor DU 316. A second path may include IAB node 1 (304), IAB node 3 (308), IAB node 4 (310), IAB node 6 (314), and donor DU 316.

In order to support the multi-hop routing of control plane (CP), user plane (UP) and/or operation and maintenance (OAM) traffic, the routing table for each IAB node and donor DU may be configured. FIG. 4 illustrates an example routing table for IAB node 4 (310) in accordance with various embodiments. In various approaches, the routing information contains a list of routing entries. Each routing entry may include a BAP routing ID and a next hop. The BAP routing ID may further include a destination BAP address and a path ID. Each destination BAP address may define a unique destination IAB node or donor DU (which may be unique within one Donor CU) as shown in FIG. 4. Each destination BAP address can have one or multiple entries in the routing table to enable local route selection.

Multiple entries for a given destination BAP address can be used for different routing paths, and can be given different path IDs.

In another example, the donor CU 318 may configure the donor DU 316 and IAB nodes with routing selection information, which may be in the form of a routing selection table. FIG. 5 illustrates an example routing selection table for donor DU 316 in accordance with various embodiments. The routing selection information may contain a list of routing selection entries and each entry might include a destination IP address, an uplink (UL) traffic type, and a BAP routing ID. Additionally, entries in the downlink (DL) routing selection information may optionally further include an IPv6 flow label or a differentiated served code point (DSCP). When donor DU 316 receive a DL packet, it detects the destination IP address, IPv6 flow label, and/or DSCP header. Then based on the configured routing selection information, donor DU 316 can determine the routing selection entry with the matching field of destination IP address. If multiple matching routing selection entries could be found, the donor DU 316 further checks other fields, such as an IPv6 flow label field and/or a DSCP field. Then donor DU 316 then selects the BAP routing ID of the routing selection entry with a maximum number of matching fields.

After performing routing selection using the routing selection information, the donor DU adds the BAP header with the BAP routing ID to the DL packet. Then, donor DU 316 checks its routing table (similar to the routing table shown in FIG. 4) to locate the routing entry with the matching BAP routing ID (and/or with the matching destination BAP address and path ID), and then determines the associated next hop node. The next hop identifies the BAP address of the child IAB node mobile terminal (MT). Then the donor DU 316 delivers the DL packet to the egress BH RLC channel with the corresponding child IAB node MT for DL transmission. Because the routing selection table (e.g., example shown in FIG. 5) and routing table (e.g., example shown in FIG. 4) are configured by the donor CU 318, the donor CU 318 can assign different routing paths to different traffic flows so as to realize a load balanced routing.

When a downstream IAB node (e.g., IAB node 4 (310)) receives the DL packet from a parent IAB node, it detects the BAP routing ID included in BAP header. If the destination BAP address contained in the BAP routing ID refers to itself, then the IAB node recognizes that it is the destination IAB node and it removes the BAP header and delivers this packet to its upper layers. Otherwise, the IAB node (e.g., IAB node 4 (310)) checks the routing table (e.g., as illustrated in FIG. 4 for IAB node 4 (310)) to get the next hop node (e.g., IAB node 2 (306)) based on the BAP routing ID matching routing entry. Finally the IAB node (e.g., IAB node 4 (310)) delivers the DL packet to the egress BH RLC channel with the corresponding child IAB node MT (e.g., MT of IAB node 2 (306)) identified as the next hop node for DL transmission.

With regard to an uplink (UL) packet, the IAB nodes may be also configured with routing selection information for UL routing selection. FIG. 6 shows an example UL routing selection table for IAB node 1 (304) in accordance with various embodiments. Generally, the UL packets for routing selection can be divided into the following categories.

In a first example, for an UL F1-U (interface for user data) data packet from access UE 302 served by distributed unit (DU) of IAB node 1 (304), the BAP layer of IAB node 1 (304) receives the UL data packet with a General Packet Radio Service (GPRS) Tunnelling Protocol (GTP), User Datagram Protocol (UDP), or Internet Protocol (IP) header. It then detects the IP and/or GTP header and determines the potential destination IP address and/or the UL GTP Tunnel Endpoint ID (GTP-TEID) in the GTP header. Then, based on the configured routing selection information (e.g., in FIG. 6), IAB node 1 (304) determines the routing selection entry with the matching fields for the destination IP address and the GTP-TEID. Based on this info, the BAP layer of the IAB node 1 (304) determines the associated BAP routing ID (e.g., the destination BAP address and path ID) for the UL data packet.

In a second example, for UE associated F1AP signalling, non-UE associated FLAP signalling, and non-F1 traffic (such as Stream Control Transmission Protocol (SCTP) 4-way handshake signalling or OAM traffic), the BAP layer of IAB node 1 (304) detects the message type and then checks the configured routing selection information (e.g., in FIG. 6) to determine the associated BAP routing ID for the UL signalling or non-F1 traffic. Then the IAB node 1 (304) adds the associated BAP routing ID to the BAP header of the UL packet. After that, IAB node 1 (304) checks the routing table (e.g., similar to FIG. 4) to get the next hop node (e.g., IAB node 2 (306) based on the matching BAP routing ID. Finally the IAB node 1 (304) delivers the UL packet to the egress BH RLC channel with corresponding parent IAB node DU identified by next hop node for UL transmission.

In certain instances, an IAB node MT or DU detects egress link failure of an UL or DL packet, and the IAB node MT or DU may then find a backup routing path for the UL or DL packet. As shown in FIGS. 3 and 6, an example of UE1's data radio bearer (DRB) is one-to-one mapped to BH RLC channels between its serving IAB node 1 (304) and donor DU 316. The BAP path ID associated with UE1's DRB may be path ID 1. With reference to FIG. 6, path ID 1 means the BH RLC channel corresponding to UE1 DRB shall be configured between IAB node 1 (304) and IAB node 2 (306), between IAB node 2 (306) and IAB node 4 (310), between IAB node 4 (310) and IAB node 5 (312), and between IAB node 5 (312) and donor DU 316. Suppose IAB node 1 (304) MT detects radio link failure (RLF) with its serving IAB node 2 (306), it may re-route the data packet to path ID 3. In this case, it is necessary to configure BH RLC channel between IAB node 1 (304) and IAB node 3 (308) for UE1's DRB. Alternatively, the data traffic originally associated with path ID 1 may be rerouted to IAB node 3 (308) via any BH RLC channels between IAB node 1 (304) and IAB node 3 (308). For DL packet, the BAP routing ID of backup routing paths should have the same destination BAP address as the original routing path, but with different egress links. For UL packets, the BAP routing ID of backup routing path should have different egress links from the original egress link. When such a backup routing path is selected from the routing selection table (e.g., FIGS. 5 and 6), the IAB node MT or DU may determine the egress BH RLC channel on the egress link of the backup path. This is called packet rerouting.

Packet rerouting may also be considered in other situations. For example, when an IAB node detects congestion over one egress link or routing path, it may reroute the data packet to another less congested egress link or routing path. However, if all the traffic delivered over the congested path is subsequently rerouted to the less congested backup path, the backup path may then become congested. Then, the traffic may then be rerouted back to the original path. In order to avoid this "ping-pong" issue, it is necessary to consider when and which traffic should be rerouted to keep network load balance. In addition, during the rerouting, it is possible that the backup path also experiences RLF or congestion. As such, the data packet could be rerouted multiple times, which may cause a routing loop for the packet. As such, a packet delay budget (PDB) requirement may not be satisfied. Various embodiments below disclose several new and inventive solutions to these problems.

In a first collection of embodiments, mechanisms for the BAP routing ID selection at donor DU 316 and access IAB node (e.g., IAB node 1 (304)) for DL and UL packets are described. In this embodiment, the donor CU 318 configures the IAB nodes (e.g., the "wireless nodes") and/or the donor DU 316 with packet rerouting configuration information. As will be discussed in detail further below, this packet rerouting configuration information may include any number of different items, including any one or more of the following: packet rerouting trigger information; at least one rerouting report indication; at least one channel priority level threshold; at least one channel rerouting indication; maximum hop information; maximum rerouting information; an inter-donor rerouting indication; an indication whether ingress filtering is enabled; an indication whether the wireless node is allowed to perform inter-donor distributed unit (DU) rerouting; or packet routing selection information.

A method of packet rerouting may include the donor CU 318 sending to the wireless node(s) or donor DU 316, and the wireless node(s) or donor DU 316 receiving from the donor CU 318, the packet rerouting configuration information. Subsequently, the wireless node(s) or donor DU 316 may reroute a transmission of a packet from a first transmission path to a second transmission path in response to, at least in part, the packet rerouting configuration information. The wireless node(s) or donor DU 316 may determine or select the second transmission path based, at least in part, on the packet rerouting configuration information. The wireless node(s) or donor DU 316 may then determine a next-hop wireless node based on this determined or selected second transmission path, and may transmit the packet to that next-hop wireless node.

As mentioned above, one example of the packet rerouting configuration information is routing selection information (e.g., similar to the tables shown in FIGS. 5 and 6). Accordingly, the wireless node determines to reroute the transmission of the packet to the second transmission path (instead of the first transmission path) based, at least in part, on this routing selection information.

The donor CU 318 configures the IAB nodes and or donor DU 316 with the routing selection information. The routing selection configuration may include at least one of the following fields: a Backhaul Adaptation Protocol (BAP) routing ID; a destination BAP address; a next hop wireless node identification; an uplink/downlink direction; a priority; a cost; a latency; and/or a hop count. For a given destination BAP address, the donor CU 318 may configure multiple routing paths associated with different path IDs and/or priorities, costs, latencies, and/or hop count values.

For an UL data packet, the IAB node may perform the BAP routing ID selection based on the priority, cost, latency, and/or hop count value. For example, for routing a data packet, an IAB node can select the BAP routing ID with the highest priority, lowest hop count, lowest cost, and/or lowest latency. Similarly, for a DL data packet, the IAB node may perform the BAP routing ID selection based on the priority, cost, latency, and/or hop count value. For example, for a data packet, an IAB node can select the BAP routing ID from the set of BAP routing IDs associated with the destination BAP address of the data packet with the highest priority, lowest hop count, lowest cost, and/or lowest latency. Accordingly, in various embodiments, the method of packet rerouting also includes determining, by the wireless node (e.g., the IAB node), based on the routing selection information, that a second transmission path has at least one of a highest priority, a lowest cost, a lowest latency, or a lowest hop count, or with a same destination BAP address of the packet.

In another example, the donor CU 318 may configure the donor DU 316 and IAB nodes with other routing selection information. The routing selection information may contain a list of routing selection entries and each entry may include the destination IP address, the GTP-TEID, and/or the UL traffic type and the associated BAP routing ID (e.g., as is shown in FIG. 6). In addition, the DL routing selection information may optionally include: IPv6 flow label and/or DSCP (e.g., as is shown in FIG. 5). When the donor DU 316 receives the DL packet, it detects the destination IP address, the IPv6 flow label, and/or the DSCP header. Then, based on the configured routing selection information, the donor DU 316 may determine the routing selection entry with the matching field of destination IP address. If multiple matching routing selection entries could be found based on the matching destination IP address, the donor DU 316 may further check the other fields, such as the IPv6 flow label and/or the DSCP. Then donor DU 316 selects the BAP routing ID of the routing selection entry with maximum number of matching fields. If there are multiple routing selection entries with same maximum number of matching fields, the donor DU 316 may randomly select one BAP routing ID for the data packet. Put another way, the wireless node or the donor DU 316 may determine multiple candidate transmission paths (e.g., BAP routing IDs) based on the routing selection information, and may then select the second transmission path by random selection from the multiple candidate transmission paths. Alternatively, the donor DU 316 may select the BAP routing ID for a data packet from the set of matching BAP routing IDs that has the highest priority, lowest hop count, lowest cost, and/or lowest latency.

In another example, the IAB node may be also configured (by the donor CU 318) with routing selection information for UL routing selection. For UL F1-U data packets from access UE (e.g., UE1 302) served by IAB node DU (e.g., IAB node 1 (304) DU), the BAP layer of the IAB node (e.g., IAB node 1 (304)) receives the UL data packet with GTP, UDP, and/or IP header. Based on the configured routing selection information, the IAB node determines the BAP routing ID associated with this F1-U tunnel. If multiple BAP routing IDs are configured with this F1-U tunnel, the IAB node may randomly select one BAP routing ID for the data packet. Alternatively, the IAB node may select the BAP routing ID for a data packet from the given F1-U tunnel with the highest priority, lowest hop count, lowest cost, and/or lowest latency. Similarly, for the UE associated F1AP signalling, non-UE associated F1AP signalling, and non-F1 traffic (such as SCTP 4-way handshake signalling or OAM traffic), if multiple BAP routing IDs are configured with a specific traffic type, the IAB node may randomly select one BAP routing ID for the packet with the specific traffic type. Alternatively, the IAB node may select the BAP routing ID for a packet with the specific traffic type with the highest priority, lowest hop count, lowest cost, and/or lowest latency.

In a second collection of embodiments, mechanisms performed at the IAB node(s) (e.g., wireless nodes) or the donor DU 316 to trigger rerouting, for example, during congestion, are described. In various approaches, the packet rerouting configuration information comprises packet rerouting trigger information. The donor CU 318 may configure (e.g., by sending to the wireless node, such that the wireless node receives the packet rerouting trigger information) one or more of the following packet rerouting trigger information for an IAB node DU or MT or the donor DU316: a buffer occupancy ratio threshold; an available buffer size threshold; an occupied buffer size threshold; a packet buffer time threshold (denoting the time it takes for a packet received from an upper layer or at an IAB node to be delivered to the next hop node); a Reference Signal Receive Power (RSRP) threshold (denoting the channel condition between IAB node MT to a parent IAB node DU, or between the IAB node DU to a child IAB node MT); or a data transmission rate threshold (denoting the bits transmitted for a given time). Further, the donor CU 318 may configure these thresholds per each BH RLC Channel for IAB MT/DU, such that different channels may have different threshold values.

These thresholds may be used to determine a congestion level. For example, if the IAB node detect the buffer occupancy ratio for DL/UL traffic is equal to or larger than the configured buffer occupancy ratio threshold, the IAB node may trigger the packet rerouting for the DL/UL traffic. Similarly, if an IAB node detects or determines that the available buffer size is equal to or smaller than the configured available buffer size threshold, or that the occupied buffer size is equal to or larger than the configured occupied buffer size threshold, or that the packet buffer time is equal to or larger than the configured packet buffer time threshold, or that the measured RSRP is lower than the RSRP threshold, or if the data transmission rate is equal or lower than the data transmission rate threshold, the IAB node may trigger the packet rerouting for packets subject to those poor conditions.

In another approach, the IAB node (wireless node) may receive flow control feedback information from at least one other wireless node (e.g., from a child IAB node or a parent IAB node). The flow control feedback info may indicate the BAP routing ID, BH RLC channel ID, and/or an available buffer size. Upon receiving the flow control feedback info, the IAB node may reroute the transmission of the packet from the first transmission path to the second transmission path in response to, at least in part, the flow control feedback information and the packet rerouting configuration information. More specifically, the IAB node may trigger the rerouting of one or more packets associated with the indicated BAP routing ID and/or BH RLC channel.

If the IAB node triggers packet rerouting for DL/UL traffic, the IAB node should find a backup routing path for the packet that is to be rerouted. For a DL packet, the BAP routing ID of the backup routing path should have the same destination BAP address as the original routing path, but may have a different egress link. For an UL packet, the BAP routing ID of the backup routing path should have a different egress link than the original egress link. In addition, it may be required that the BAP routing ID of the backup routing path has the same destination BAP address as the original routing path. When such a backup routing path is selected from the routing selection table, the IAB node may deliver the data packet to the next hop based on the new BAP routing ID of the backup path.

If multiple BAP routing IDs with different backup routing paths can be determined, the IAB node may randomly select one BAP routing ID for the packet rerouting. Alternatively, the IAB node may select the BAP routing ID from the candidate backup paths that has the highest priority, lowest hop count, lowest cost, and/or lowest latency.

In another example, if the IAB node or donor DU 316 can determine a remaining PDB of the packet, then the IAB node or donor DU 316 may check whether the remaining PDB is larger than the latency of the selected routing path. If yes, then the selected routing path could be still used. However, if it is smaller than the latency of the currently selected routing path, the IAB node or donor DU 316 may select a backup routing path with a path latency that is less than or equal to the remaining PDB. If multiple backup routing paths can be detected, the IAB node may randomly select one backup path for the packet rerouting. Then IAB node may then deliver the data packet to the next hop based on the new BAP routing ID of the backup path.

In addition, if the packet rerouting happens, the IAB node or donor DU 316 may send rerouting reporting information regarding the rerouting to the donor CU 318. In various examples, the rerouting reporting information comprises at least one of the following: a BAP routing ID of the first transmission path; a BAP routing ID of the second transmission path; a duration of the rerouting; a data rate of the second transmission path; and/or a data volume of the second transmission path. For example, if the donor CU-UP receives RLF information from the IAB node DU, the donor CU-UP may also report the RLF info together with the IAB node DU ID to donor CU-CP. Further, the donor CU 318 may configure the IAB nodes or donor CU 318 with packet rerouting configuration information including at least one rerouting report indication, which indicates whether rerouting reporting information should be sent to the donor CU 318, and possibly which types of information should be sent.

In a third collection of embodiments, various mechanisms to effect inter-donor DU rerouting are described. FIG. 7 illustrates an example network where two donor DUs (donor DU1 (708) and donor DU2 (710)) are connected to the donor CU 712. The IP addresses of IAB node DUs are allocated by each donor DU. The donor DU1 (708) and donor DU2 (710) may allocate the IP address for the various IAB nodes. For example, supposed IAB node 2 (702) is configured with redundant routing paths, such as path ID 1 (IAB node 2 (702), IAB node 1 (706), and donor DU1 (708)) and path ID 2 (IAB node 2 (702), IAB node 1 (706), and donor DU2 (710)). In this arrangement, both donor DU1 (708) and donor DU2 (710) allocate different IP addresses anchored on it for IAB node 2 (702). Suppose IP Address 1 and IP Address 2 are allocated by donor DU1 (708) and donor DU2 (710), respectively. Then IAB node 2 (702) may utilize IP Address 1 and IP Address 2 as the source IP address for the UL packet associated with path ID 1 and path ID 2, respectively. In this way, each donor DU can receive the data packet with the source IP address anchored on it, and can then forward the packet to the donor CU 712.

However, donor DUs may discard received UL packet due to ingress filtering applied by routers and middle boxes on the wireline network. Ingress filtering is usually applied as security measure to protect the network from address spoofing. It can be enabled or disabled for donor DUs according to operator's preferences. Suppose IAB node 1 (706) detects RLF over the egress link towards donor DU1 (708), it may be possible for IAB node 1 (706) to reroute the UL packet destined toward donor DU1 (708) to donor DU2 (710). This is called inter-donor DU rerouting. However, if ingress filtering is enabled, the rerouted UL packet will be discarded at donor DU2 (710), for example, because the IP address of the source of the packet may not match the allocated IP addresses for donor DU2 (710).

To solve this problem, donor CU 712 may configure the IAB node(s) or donor DUs with a rerouting indication, which indicates whether the IAB node or donor DU is allowed to perform inter-donor DU rerouting. As configured, the IAB nodes (e.g., wireless nodes) receive from the donor CU an indication whether the IAB node (e.g., wireless node) is allowed to perform inter-donor distributed unit (DU) rerouting. Alternatively, donor CU may configure the IAB nodes or donor DUs with an indication, which indicates whether ingress filtering is enabled, for example, whether a particular donor DU has ingress filtering enabled, or whether the destination BAP address should be considered when selecting backup path for UL traffic. In so configuring, the IAB nodes (e.g., wireless nodes) receive from the donor CU an indication whether a donor DU has ingress filtering enabled. As such, based on this rerouting indication, the IAB node may determine that it is allowed to reroute transmission of the packet based on the prior to rerouting the transmission of the packet from the first transmission path to the second transmission path, wherein the second transmission path includes a different donor DU (e.g., donor DU2 (710)) than the first transmission path (e.g., donor DU1 (708)).

For example, suppose IAB node 1 (706) detects RLF over the egress link towards donor DU1 (708) and IAB node 1 (706) receives the rerouting indication (from donor CU 712) indicating that the inter-donor DU rerouting is enabled. IAB node 1 (706) may then reroute the UL packet associated with path ID 1 to path ID 2 and deliver the packet to donor DU2 (710). Otherwise, IAB node 1 (708) may suspend the UL transmission towards donor DU1 (708) until the RLF recovery.

In a fourth collection of embodiments, various methods to avoid undesirable rerouting issues (e.g., repeated rerouting, routing loops, and "ping-pong" back and forth rerouting) are described. As mentioned in previous examples, when the IAB node detects RLF or congestion over one egress link or routing path, it may reroute the data packet to another less congested egress link or routing path. However, if all the traffic delivered over the congested path is now rerouted to the less congested backup path, the backup path may become congested. In order to avoid this "ping-pong" issue, it is necessary to consider which traffic should be rerouted to maintain a network load balance. As such, in accordance with various embodiments, the method of rerouting a data packet also includes the wireless node (e.g., IAB node and/or donor DU) determining that the packet can be rerouted prior to rerouting the packet from the first transmission path to the second transmission path.

In one approach, referring again to FIG. 3, the donor CU 318 may configure the IAB node or donor DU 316 with a channel priority level threshold. Put another way, the wireless node (e.g., IAB nodes or donor DU 316) receives the packet rerouting configuration information comprising a channel priority level threshold from the donor CU 318. If packet rerouting is triggered (e.g., as discussed above), the IAB node or donor DU 316 may check if the packet's BH RLC channel's priority value is equal to or lower than the priority threshold. (In this example, a lower priority value denotes higher priority, though the opposite may be true as well.) The IAB node or donor DU 316 may determine that it can reroute the data packet from this BH RLC channel to another transmission path. Otherwise, the data packet from this BH RLC channel is not rerouted. The wireless node (IAB node or donor DU 316) determines that the packet is from a channel having a channel priority level that is equal or lower than the channel priority level threshold, and responsively determines that the packet can be rerouted from the first transmission path to the second transmission path.

In another similar approach, donor CU 318 may configure the IAB node or donor DU 316 with a rerouting indication for each BH RLC channel. Put another way, the wireless node (e.g., IAB nodes or donor DU 316) receives from the donor CU 318 the packet rerouting configuration information comprising a channel rerouting indication indicating whether packets from one or more channels can be rerouted. The rerouting indication indicates whether the rerouting is allowed for data packet from each BH RLC channel. Suppose the IAB node or donor CU 318 detects a RLF or congestion, or determines that a latency issue, with an original BAP routing ID. The IAB node or donor DU 316 may check the rerouting indication associated with the BH RLC channel. If rerouting is allowed, the IAB node or donor DU 316 may determine that it can reroute the data packet from this BH RLC channel. Otherwise, the data packet from this BH RLC channel is not re-routed. Accordingly, the wireless node (e.g., IAB nodes or donor DU 316) determines that the packet is from the channel having the channel rerouting indication that indicates packets from the channel can be rerouted, and responsively determining that the packet can be rerouted from the first transmission path to the second transmission path.

In another approach, the IAB node or donor DU 316 may receive the flow control feedback info from at least one other wireless node (e.g., a child IAB node or parent IAB node). The flow control feedback information may indicate the BAP routing ID (feedback BAP routing ID), BH RLC channel ID (feedback BH RLC channel ID) or available buffer size. Upon receiving the flow control feedback info, the IAB node may determine that the packet either has a BAP routing ID that matches the feedback BAP routing ID or is from a channel corresponding to the feedback BH RLC channel ID, and responsively determine that the packet can be rerouted from the first transmission path to the second transmission path. The IAB node may trigger the rerouting of packets associated with the indicated feedback BAP routing ID and or feedback BH RLC channel.

In another approach, the donor CU 318 may configure the IAB node or donor DU 316 with a rerouting percentage value or probability value. The rerouting percentage value may be configured per IAB node or per each BH RLC channel. In this approach, the packet rerouting configuration information comprises at least one rerouting percentage value assigned to the wireless node, or at least one rerouting percentage value assigned to one or more channels. When the rerouting percentage value or probability value is configured per BH RLC channel, the IAB node or donor DU 316 should ensure that the percentage of data packets rerouted for that channel is less than the configured rerouting percentage value or probability value. Otherwise, the other data packet from this BH RLC channel should be suspended or routed via their original path. Accordingly, when the rerouting percentage value is configured per wireless node (e.g., per IAB node or donor CU), the wireless node determines that a percentage of rerouted packets by the wireless node is less than the rerouting percentage value, and responsively determines that the packet can be rerouted from the first transmission path to the second transmission path. Similarly, when the rerouting percentage value is configured per channel, the wireless node (e.g., IAB node or donor CU) determines that the packet is from a channel having a percentage of rerouted packets that is less than the rerouting percentage value assigned to the channel, and responsively determining that the packet can be rerouted from the first transmission path to the second transmission path.

The above approaches could be used in any combination. For example, the donor CU 318 may configure the IAB node or donor DU 316 with both a priority threshold and rerouting percentage value/probability value. In this case, only the BH RLC channels with a logical channel priority that satisfies the priority threshold may be rerouted, and thus, the number of rerouted data packets should satisfy the rerouting percentage/probability value.

In a fifth collection of embodiments, additional methods to avoid undesirable rerouting issues (e.g., repeated rerouting, routing loops, and "ping-pong" back and forth rerouting) are described. These embodiments primarily involve the use of a hope count field or a reroute count field in a header of the packet to indicate how many hope the packet has been through or how many times the packet has been rerouted. By limiting one or both of these values, excessive or repeated rerouting activities may be avoided.

For UL packet rerouting, a routing path via descendant or child node may be considered. Similarly, the routing path via parent node may be considered for DL packet rerouting. For example, the donor CU may configure IAB node with detoured routing paths. These detoured routing path could be used when the shortest routing path is not available, for example, due to congestion or RLF.

FIG. 8 shows another example network arrangement including various IAB nodes. As illustrated in the example network arrangement of FIG. 8, donor CU 818 could configure IAB node 4 (808) with routing path 1 (IAB node 4 (808), IAB node 2 (804), IAB node 1 (802), donor DU 816), routing path 2 (IAB node 4 (808), IAB node 3 (806), IAB node 1 (802), donor DU 816), and routing path 3 (IAB node 4 (808), IAB node 5 (810), IAB node 7 (814), IAB node 6 (812), donor DU 816). Suppose IAB node 4 (808) detects that routing path 1 is not available. Then, IAB node 4 (808) may select the routing path 2 or routing path 3 for packet rerouting.

Similarly, for DL data forwarding, donor CU 808 may configure IAB node 2 (804) with two routing path towards IAB node 5 (810), for example, routing path 4 (IAB node 2 (804), IAB node 4 (808), IAB node 5 (810)) and routing path 5 (IAB node2 (804), IAB node 1 (802), IAB node 3 (806), IAB node 4 (808), IAB node 5 (810)). Suppose IAB node 2 (804) detects the routing path 4 is not available. IAB node 2 (804) may then select the routing path 5 and reroute the DL packet to IAB node 1 (802).

Generally speaking, the detoured routing paths may introduce more packet forwarding hops. In addition, it is possible that the backup rerouting paths also experience RLF or congestion during the rerouting. As such, it is possible that the data packet could be rerouted multiple times, which may cause the routing loop. Further, it may cause a failure to satisfy the PDB requirement for the packet. For example, IAB node 2 (804) may detect RLF on the link with IAB node 1 (802), and IAB node 4 (808) may select the detoured path to reroute the UL packet to IAB node 3 (806). Then IAB node 4 (808) may forward this packet to IAB node 3 (806). When the UL packet arrives at IAB node 3 (806), IAB node 3 (806) detects the RLF of link with IAB node 1 (802). Then IAB node 3 (806) may further reroute the data packet to IAB node 4 (808). In this case, the UL packet is delivered to IAB node 4 (808) repeatedly, which should be avoided.

To solve these problems, in a first approach, a hop count field is added in the BAP header. The hop count field indicates a remaining number of allowed data forwarding hops. When a data packet arrives at an IAB node, the IAB node decrements the hop count value in the BAP header of the packet by 1 prior to transmitting the packet. When the data packet arrives at an IAB node and the updated hop value is 0, and the data packet has not yet arrived at the destination IAB node, the packet should be discarded at that IAB node. Thus, a wireless node (e.g., IAB node) determines that the hop count field in the header of the packet indicates that the packet has not exceeded a maximum number of allowable hops prior to retransmitting the packet along an original first transmission path, or rerouting the transmission of the packet from the first transmission path to the second transmission path. More specifically, in this example, the wireless node (IAB node) determines that the hop count field is greater than zero prior to transmitting the packet.

Donor CU 818 may configure maximum hop information for the IAB node(s) and/or the donor DU 816, wherein the wireless nodes (e.g., IAB node(s) or donor DU 816) receive the maximum hop information from the donor CU 818. This maximum hop information may include one or more of the following: a maximum hop value assigned to the wireless node; a maximum hop value assigned to a Backhaul Adaptation Protocol (BAP) routing ID; a maximum hop value assigned to a General Packet Radio System (GPRS) Tunnelling Protocol User Plane (GTP-U) tunnel; a maximum hop value assigned to non-user equipment (UE) associated signalling; a maximum hop value assigned to UE associated signalling; a maximum hop value assigned to non-F1 traffic; or a maximum hop value assigned to at least one of an IP address, an IP prefix, an IPv6 flow label, or a Differentiated Services Code Point (DSCP). The maximum hop value may be configured per GTP-U tunnel, per non-UE associated signalling, per UE associated signalling, and/or per non-F1 traffic for UL backhaul. For an UL packet, after determining the BAP routing ID, the IAB node may add the associated BAP routing ID to the BAP header and may set the hop count field in the BAP header of the UL packet to the configured maximum hop value. Similarly, for DL backhaul, the donor CU 818 may configure the maximum hop value for the donor DU 816 together with each of the routing selection information identified by destination IP address, IP prefix, IPv6 flow label, and/or DSCP. The donor DU 816 may then select the BAP routing ID and add the BAP header to the DL packet. The donor DU 816 can also set the hop count field in the BAP header to the configured maximum hop value.

Alternatively, when adding the BAP header to an UL or DL packet, the initial hop count value is set to 0 at the IAB node or the donor DU 816. When data packet is forwarded to the next hop node, that IAB node increments the hop count value in the BAP header by 1. When data packet arrives at an IAB node, and the updated hop value is equal to the maximum hop value assigned at that IAB node, and the data packet has not yet arrive the destination IAB node, this packet should be discarded at that IAB node.

In a second approach, a reroute count field and/or a rerouting indication is added in the BAP header. The rerouting indication field indicates whether rerouting is allowed during the packet forwarding. The reroute count field indicates how many times rerouting is allowed or has occurred. When receiving a packet, a wireless node (e.g., IAB node or donor DU) determines that the reroute count field in a header of the packet indicates that the packet has not exceeded a maximum number of allowable reroutings prior to rerouting the transmission of the packet from the first transmission path to the second transmission path.

The donor CU 818 may configure the rerouting indication or maximum rerouting information for the IAB node(s) or donor DU 816, wherein the wireless nodes (e.g., IAB node(s) or donor DU 816) receive the rerouting indication and/or the maximum rerouting information from the donor CU 818. This maximum rerouting information may include one or more of the following: a maximum allowable rerouting value assigned to the wireless node; a maximum allowable rerouting value assigned to a BAP routing ID; a maximum allowable rerouting value assigned to a GTP-U tunnel; a maximum allowable rerouting value assigned to non-UE associated signalling; a maximum allowable rerouting value assigned to UE associated signalling; a maximum allowable rerouting value assigned to non-F1 traffic; or a maximum allowable rerouting value assigned to at least one of an IP address, an IP prefix, an IPv6 flow label, or a DSCP. This maximum allowable rerouting value may be configured per GTP-U tunnel, per non-UE associated signalling, per UE associated signalling, and/or per non-F1 traffic for UL backhaul. For an UL packet, after determining the BAP routing ID, and IAB node can add the rerouting indication and/or the reroute count field to the BAP header of the UL packet, and may set the reroute count field according to the maximum rerouting information (e.g., setting it to the maximum allowable rerouting value). Similarly, for DL backhaul, donor CU 818 may configure the rerouting indication or maximum rerouting information for the donor DU 816 together with each the routing selection info identified by destination IP address, IP prefix, IPv6 flow label, and/or DSCP. The donor DU 816 can select the BAP routing ID and add the BAP header to the DL packet. The donor DU 816 may also set the rerouting indication and/or set the reroute count field in the BAP header according to the maximum rerouting information (e.g., to the configured maximum allowable rerouting value).

In one example, every time an IAB node reroutes the packet, the node decrements the reroute count field in the header of the packet prior to transmitting the packet. For example, if a rerouting indication with value 1 is carried in the BAP header of a packet, and the rerouting is triggered for this packet at the IAB node or an intermediate IAB node or donor DU, the IAB node or intermediate IAB node or donor DU may decrement the reroute count field by one and update the rerouting indication to 0 and update the BAP routing ID to the rerouted routing ID. Then the packet is rerouted to the selected backup routing path. However, the rerouting indication of 0 means that the rerouting is not allowed in the subsequent data forwarding.

Alternatively, suppose a rerouting indication includes a value of 1 in the BAP header, and rerouting is triggered at IAB node or intermediate IAB node or donor DU 816. The IAB node or intermediate IAB node or donor DU 816 may reroute the data packet based on the rerouting indication. However, if the re-routing indication with value 0 is carried in the BAP header, it means packet re-routing is not allowed for this packet.

In another approach, if the reroute count value is carried in the BAP header, it may indicate how many times the data packet can be rerouted. When rerouting happens, the node decrements the reroute count field by 1. When the reroute count field reaches 0, it means this packet can no longer be rerouted in the subsequent data forwarding path. Accordingly, the wireless node (e.g., IAB node or donor CU) may determine that the reroute count field is greater than zero prior to rerouting the transmission of the packet from the first transmission path to the second transmission path.

In another example, every time an IAB node reroutes the packet, the node increments the reroute count field in the header of the packet prior to transmitting the packet. The reroute count field may be initially set to zero. When the data packet arrives at an IAB node, the node may determine that the reroute count field is less than or equal to an assigned maximum number of allowable reroutings for the packet according to the maximum rerouting information, and may determine that the packet can be rerouted again. Otherwise, the packet will remain on the first transmission path.

In this way, the data rerouting times and accumulated hop count (in the above approach) for the data rerouting can be restricted.

FIG. 9 shows an example system diagram including an example wireless node/UE 502 and a wireless node 504 with a wireless access network according to various embodiments. The wireless access network provides network connectivity between wireless nodes and/or user equipment (UE) devices and an information or data network (such as a voice communication network or the Internet). An example wireless access network may be based on cellular technologies, which may further be based on, for example, 4G, Long Term Evolution (LTE), 5G, New Radio (NR), and/or New Radio Unlicensed (NR-U) technologies and/or formats. The wireless node/UE 502 may comprise a UE, which may further include but is not limited to a mobile phone, smart phone, tablet, laptop computer, or other mobile devices that are capable of communicating wirelessly over a network. Alternatively, the wireless node/UE 502 may comprise a wireless relaying node such as an IAB node. When acting as a relaying node, the wireless node/UE 502 may serve as an intermediary wireless node between an upstream wireless access point and a downstream UE and/or another downstream relaying node (such as another IAB node). The wireless node/UE 502 may include transceiver circuitry 506 coupled to an antenna 508 to effect wireless communication with the wireless node 504 upstream, and/or other wireless nodes or UE downstream. The transceiver circuitry 506 may also be coupled to a processor 510, which may also be coupled to a memory 512 or other storage device. The memory 512 may store therein instructions or code that, when read and executed by the processor 510, cause the processor 510 to implement various ones of the methods described herein.

Similarly, the wireless node 504 may comprise a base station or other wireless network access points capable of communicating wirelessly over a network with one or many other wireless nodes and/or UEs. For example, the wireless node 504 may comprise a 4G LTE base station, a 5G NR base station, a 5G central-unit base station, a 5G distributed-unit base station, or a next generation Node B (gNB), an enhanced Node B (eNB), or other base station, in various embodiments. Alternatively, as discussed above, wireless node 504 may also comprise a wireless relaying node (such as another IAB node or an IAB donor), which may in turn communicate with a wireless access point further upstream. The wireless node 504 may include transceiver circuitry 514 coupled to an antenna 516, which may include an antenna tower 518 in various approaches, to effect wireless communication with the wireless node/UE 502. The transceiver circuitry 514 may also be coupled to one or more processors 520, which may also be coupled to a memory 522 or other storage device. The memory 522 may store therein instructions or code that, when read and executed by the processor 520, cause the processor 520 to implement various ones of the methods described herein.

The wireless access network may provide or employ various transmission formats and protocols for wireless message transmission between the wireless node/UE 502 and the wireless node 504, and between other wireless nodes and UE within the network.

In various embodiments, as illustrated in FIG. 9, the wireless node/UE 502 includes a processor 510 and a memory 512, wherein the processor 510 is configured to read computer code from the memory 512 to implement any of the methods and embodiments disclosed above relating to operations of the wireless node/UE 502. Similarly, the wireless node 504 includes a processor 520 and a memory 522, wherein the processor 520 is configured to read computer code from the memory 522 to implement any of the methods and embodiments disclosed above relating to operations of the wireless node 504. Also, in various embodiments, a computer program product includes a non-transitory computer-readable program medium (e.g., memory 512 or 522) with computer code stored thereupon. The computer code, when executed by a processor (e.g., processor 510 or 520), causes the processor to implement a method corresponding to any of the embodiments disclosed above.

In accordance with the various methods and embodiments disclosed above, various technical advantages are realized. Primarily, packet rerouting in an IAB network is possible, while still avoiding repeated rerouting, routing loops, and "ping-pong" back and forth rerouting.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method of packet rerouting, the method comprising:

receiving, by a wireless node from a donor central unit (CU), packet rerouting configuration information including an indication whether the wireless node is allowed to perform inter-donor distributed unit (DU) rerouting;

determining, by the wireless node, that the wireless node is allowed to reroute transmission of the packet based on the indication; and rerouting, by the wireless node, a transmission of a packet from a first transmission path to a second transmission path in response to, at least in part, the packet rerouting configuration information, wherein the second transmission path includes a different donor DU than the first transmission path.

2. The method according to claim 1, further comprising:

rerouting, by the wireless node, the transmission of the packet in response to at least one of the following:

determining, by the wireless node, that a buffer occupancy ratio is equal to or larger than a buffer occupancy ratio threshold;

determining, by the wireless node, that an available buffer size is equal to or smaller than an available buffer size threshold;

determining, by the wireless node, that an occupied buffer size is equal to or larger than an occupied buffer size threshold;

determining, by the wireless node, that a packet buffer time is equal to or larger than a packet buffer time threshold;

determining, by the wireless node, that a measured Reference Signal Receive Power (RSRP) is equal to or smaller than an RSRP threshold; or determining, by the wireless node, that a data transmission rate is equal to or smaller than a data transmission rate threshold.

3. The method according to claim 1, further comprising:

receiving, by the wireless node from at least one other wireless node, flow control feedback information; and rerouting, by the wireless node, the transmission of the packet from the first transmission path to the second transmission path in response to, at least in part, the flow control feedback information and the packet rerouting configuration information.

4. The method according to claim 1, further comprising:
determining, by the wireless node, that the packet can be rerouted prior to rerouting the packet from the first transmission path to the second transmission path;
receiving, by the wireless node from the donor CU, the packet rerouting configuration information comprising a channel priority level threshold; and
determining, by the wireless node, that the packet is from a channel having a channel priority level that is equal or lower than the channel priority level threshold, and responsively determining that the packet can be rerouted from the first transmission path to the second transmission path.

5. The method according to claim 1, further comprising:
determining, by the wireless node, that the packet can be rerouted prior to rerouting the packet from the first transmission path to the second transmission path;
receiving, by the wireless node from the donor CU, the packet rerouting configuration information comprising a channel rerouting indication indicating whether packets from a channel can be rerouted; and
determining, by the wireless node, that the packet is from the channel having the channel rerouting indication that indicates packets from the channel can be rerouted, and responsively determining that the packet can be rerouted from the first transmission path to the second transmission path.

6. The method according to claim 1, further comprising:
determining, by the wireless node, that the packet can be rerouted prior to rerouting the packet from the first transmission path to the second transmission path;
receiving, by the wireless node from the donor CU, the packet rerouting configuration information comprising at least one rerouting percentage value assigned to the wireless node; and
determining, by the wireless node, that a percentage of rerouted packets by the wireless node is less than the rerouting percentage value, and responsively determining that the packet can be rerouted from the first transmission path to the second transmission path.

7. The method according to claim 1, further comprising:
determining, by the wireless node, that the packet can be rerouted prior to rerouting the packet from the first transmission path to the second transmission path;
receiving, by the wireless node from the donor CU, the packet rerouting configuration information comprising at least one rerouting percentage value assigned to one or more channels; and
determining, by the wireless node, that the packet is from a channel having a percentage of rerouted packets that is less than the rerouting percentage value assigned to the channel, and responsively determining that the packet can be rerouted from the first transmission path to the second transmission path.

8. The method according to claim 1, further comprising:
determining, by the wireless node, that the packet can be rerouted prior to rerouting the packet from the first transmission path to the second transmission path;
receiving, by the wireless node from at least one other wireless node, flow control feedback information further comprising at least one of a feedback backhaul adaptation protocol (BAP) routing ID or a feedback backhaul (BH) radio link control (RLC) channel ID; and
determining, by the wireless node, that the packet at least one of has a BAP routing ID that matches the feedback BAP routing ID or is from a channel corresponding to the feedback BH RLC channel ID, and responsively determining that the packet can be rerouted from the first transmission path to the second transmission path.

9. The method according to claim 1, further comprising:
determining, by the wireless node, that a hop count field in a header of the packet indicates that the packet has not exceeded a maximum number of allowable hops prior to rerouting the transmission of the packet from the first transmission path to the second transmission path.

10. The method according to claim 9, further comprising:
receiving, by the wireless node from the donor CU, maximum hop information; and
setting the hop count field in the header according to the maximum hop information.

11. The method according to claim 1, further comprising:
determining, by the wireless node, that a reroute count field in a header of the packet indicates that the packet has not exceeded a maximum number of allowable reroutings prior to rerouting the transmission of the packet from the first transmission path to the second transmission path.

12. The method according to claim 11, further comprising:
receiving, by the wireless node from the donor CU, maximum rerouting information; and
setting the reroute count field in the header of the packet according to the maximum rerouting information.

13. The method according to claim 1, further comprising:
receiving, by the wireless node from the donor CU, an indication whether ingress filtering is enabled.

14. The method according to claim 1, wherein rerouting the transmission of the packet from the first transmission path to the second transmission path further comprises:
determining the second transmission path based, at least in part, on the packet rerouting configuration information;
determining a next-hop wireless node based on the second transmission path; and
transmitting the packet to the next-hop wireless node.

15. A wireless node, comprising:
a memory storing computer code instructions; and
a processor configured to communicate with the memory and to execute the computer code instructions to cause the wireless node to perform a method comprising:
receiving, by the wireless node from a donor central unit (CU), packet rerouting configuration information and an indication whether the wireless node is allowed to perform inter-donor distributed unit (DU) rerouting;
determining, by the wireless node, that the wireless node is allowed to reroute transmission of the packet based on the indication; and
rerouting, by the wireless node, a transmission of a packet from a first transmission path to a second transmission path in response to, at least in part, the packet rerouting configuration information, wherein the second transmission path includes a different donor DU than the first transmission path.

16. The wireless node according to claim 15, wherein the processor is configured to execute the computer code instructions to cause the wireless node to perform the method further comprising:
rerouting, by the wireless node, the transmission of the packet in response to at least one of the following:

determining, by the wireless node, that a buffer occupancy ratio is equal to or larger than a buffer occupancy ratio threshold;

determining, by the wireless node, that an available buffer size is equal to or smaller than an available buffer size threshold;

determining, by the wireless node, that an occupied buffer size is equal to or larger than an occupied buffer size threshold;

determining, by the wireless node, that a packet buffer time is equal to or larger than a packet buffer time threshold;

determining, by the wireless node, that a measured Reference Signal Receive Power (RSRP) is equal to or smaller than an RSRP threshold; or determining, by the wireless node, that a data transmission rate is equal to or smaller than a data transmission rate threshold.

17. The wireless node according to claim 15, wherein the processor is configured to execute the computer code instructions to cause the wireless node to perform the method further comprising:

receiving, by the wireless node from at least one other wireless node, flow control feedback information; and rerouting, by the wireless node, the transmission of the packet from the first transmission path to the second transmission path in response to, at least in part, the flow control feedback information and the packet rerouting configuration information.

18. A computer program product comprising a non-transitory computer-readable program medium with computer code stored thereupon, the computer code, when executed by a processor, causing the processor to implement a method comprising:

receiving, from a donor central unit (CU), packet rerouting configuration information and an indication whether a wireless node is allowed to perform inter-donor distributed unit (DU) rerouting;

determining that the wireless node is allowed to reroute transmission of the packet based on the indication; and rerouting a transmission of a packet from a first transmission path to a second transmission path in response to, at least in part, the packet rerouting configuration information, wherein the second transmission path includes a different donor DU than the first transmission path.

19. The computer program product according to claim 18, wherein the computer code, when executed by the processor, causes the processor to implement the method further comprising:

rerouting, by the wireless node, the transmission of the packet in response to at least one of the following:

determining, by the wireless node, that a buffer occupancy ratio is equal to or larger than a buffer occupancy ratio threshold;

determining, by the wireless node, that an available buffer size is equal to or smaller than an available buffer size threshold;

determining, by the wireless node, that an occupied buffer size is equal to or larger than an occupied buffer size threshold;

determining, by the wireless node, that a packet buffer time is equal to or larger than a packet buffer time threshold;

determining, by the wireless node, that a measured Reference Signal Receive Power (RSRP) is equal to or smaller than an RSRP threshold; or determining, by the wireless node, that a data transmission rate is equal to or smaller than a data transmission rate threshold.

* * * * *